US010015229B2

(12) United States Patent
Barajas Gonzalez et al.

(10) Patent No.: US 10,015,229 B2
(45) Date of Patent: Jul. 3, 2018

(54) METADATA SHARING TO DECREASE FILE TRANSFER TIME (71) Applicant: INTERNATIONAL BUSINESS MACHINES CORPORATION, Armonk, NY (US)

(72) Inventors: Emmanuel Barajas Gonzalez, El Salto (MX); Shaun E Harrington, Tucson, AZ (US); Ben K Rawlins, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 296 days.

(21) Appl. No.: 14/630,147

(22) Filed: Feb. 24, 2015

(65) Prior Publication Data

US 2016/0248841 A1    Aug. 25, 2016

(51) Int. Cl.
*H04L 29/08* (2006.01)
*G06F 3/06* (2006.01)

(52) U.S. Cl.
CPC ............ *H04L 67/06* (2013.01); *G06F 3/065* (2013.01); *G06F 3/067* (2013.01); *G06F 3/0619* (2013.01); *H04L 67/2804* (2013.01); *H04L 67/34* (2013.01)

(58) Field of Classification Search
CPC ............ G06F 3/0641; G06F 17/30159; G06F 11/1453; G06F 3/0608; G06F 11/1461; G06F 11/1451; G06F 17/3015; G06F 3/067; G06F 3/065; G06F 3/0619; H04L 67/06; H04L 67/1095; H04L 67/2804; G06Q 40/08; H04N 21/2323
See application file for complete search history.

(56) References Cited

U.S. PATENT DOCUMENTS

| 5,794,254 | A  | * | 8/1998  | McClain ............... G06Q 40/08 707/609 |
| 6,434,683 | B1 |   | 8/2002  | West et al. |
| 9,235,475 | B1 | * | 1/2016  | Shilane ............... G06F 11/1453 |
| 2005/0144186 | A1 | * | 6/2005 | Hesselink ............. H04L 67/06 |
| 2010/0088297 | A1 |  | 4/2010 | Kiilerich et al. |
| 2010/0094817 | A1 | * | 4/2010 | Ben-Shaul ............ G06F 3/0608 707/697 |
| 2010/0094950 | A1 | * | 4/2010 | Zuckerman ......... H04L 67/1008 709/213 |
| 2012/0303595 | A1 | * | 11/2012 | Liu ..................... G06F 11/1453 707/692 |

(Continued)

FOREIGN PATENT DOCUMENTS

KR   20100088297 A   11/2010

*Primary Examiner* — Vivek Srivastava
*Assistant Examiner* — Muhammad Raza
(74) *Attorney, Agent, or Firm* — Griffiths & Seaton PLLC (57) ABSTRACT

A method, system, and computer program product for efficient data transfer using metadata sharing. The method includes: determining difference blocks by comparing a metadata map of a requested file to a pre-existing metadata map at a receiving site, wherein a difference block is a data block the receiving site needs to generate the requested file; mapping the difference blocks in a missing metadata map; transmitting the missing metadata map from the receiving site; and transferring the difference blocks to the receiving site from a plurality of available servers, wherein the difference blocks are transferred to allow for the fastest transmission.

8 Claims, 5 Drawing Sheets

(56) References Cited

U.S. PATENT DOCUMENTS

| | | | | |
|---|---|---|---|---|
| 2013/0173737 | A1* | 7/2013 | Liu | H04N 21/23439 |
| | | | | 709/213 |
| 2014/0259109 | A1* | 9/2014 | Houston | H04L 63/10 |
| | | | | 726/3 |
| 2015/0149589 | A1* | 5/2015 | Hao | H04W 8/22 |
| | | | | 709/219 |
| 2015/0271299 | A1* | 9/2015 | Bullotta | H04L 69/08 |
| | | | | 709/230 |
| 2016/0004721 | A1* | 1/2016 | Iyer | G06F 17/30212 |
| | | | | 707/649 |
| 2016/0055014 | A1* | 2/2016 | Gallimore | G06F 9/44521 |
| | | | | 719/320 |

* cited by examiner

METADATA SHARING TO DECREASE FILE TRANSFER TIME

BACKGROUND OF THE INVENTION

1. Field of the Invention

The present invention relates to computing systems, and more specifically, to various embodiments for efficient data transfer in computing systems implementing metadata sharing in a grid network.

2. Description of the Related Art

Data is storable on disks or flash storage drives. Storage drives can exist as a solo entity, or as part of a larger network storage environment. It is not uncommon for groups of several individual computers or clusters, to facilitate data storage and transfer.

Concerning a data transfer, the concept is generally the same regardless of medium, a file is broken into pieces which are subsequently transferred over a network. The keys to increasing the productivity, speed and rate of a file transfer are to send and receive faster. The focal point of innovations in file transfers have been the pipe and devices themselves. Generally, no preparation of the actual data is ever necessary or implemented. With the increase of device speeds, file transfer speeds have increased, but so has the width of the pipe. No groundwork is laid in the event a user wants to send an additional file or a multitude of additional files.

In a data transfer, a transferring unit transfers an entire copy of a file to a receiving unit. This occurs even in instances where a file is only slightly updated from a previous version, the transferring unit transfers the entire file to the receiving unit, which then replaces the old file with the updated file. Transferring an entire file takes time, especially if the file is large. The present invention proposes solutions to the limitations that are inherent in the prior art.

SUMMARY OF THE INVENTION

The present invention provides a method for efficient data transfer using metadata sharing, the method including: determining difference blocks by comparing a metadata map of a requested file to a pre-existing metadata map at a receiving site, wherein a difference block is a data block the receiving site needs to generate the requested file; mapping the difference blocks in a missing metadata map; transmitting the missing metadata map from the receiving site; and transferring the difference blocks to the receiving site from a plurality of available servers, wherein the difference blocks are transferred to allow for the fastest transmission.

Additionally, the present invention provides a system for efficient data transfer using metadata sharing in a computing environment, the system including: at least one processor device operable in the computing environment, wherein the at least one processor device: determines difference blocks by comparing a metadata map of a requested file to a pre-existing metadata map at a receiving site, wherein a difference block is a data block the receiving site needs to generate the requested file; maps the difference blocks in a missing metadata map; transmits the missing metadata map from the receiving site; and transfers the difference blocks to the receiving site from a plurality of available servers, wherein the difference blocks are transferred to allow for the fastest transmission.

Further, the present invention provides a computer program product for efficient data transfer using metadata sharing, the computer program product including a non-transitory computer-readable storage medium having computer-readable program code portions including: a first executable portion that determines difference blocks by comparing a metadata map of a requested file to a pre-existing metadata map at a receiving site, wherein a difference block is a data block the receiving site needs to generate the requested file; a second executable portion that maps the difference blocks in a missing metadata map; a third executable portion that transmits the missing metadata map from the receiving site; and a fourth executable portion that transfers the difference blocks to the receiving site from a plurality of available servers, wherein the difference blocks are transferred to allow for the fastest transmission.

DETAILED DESCRIPTION OF PREFERRED EMBODIMENTS

The present invention provides a method, system, and computer program product to decrease a file transfer time using metadata sharing. Generally, metadata refers to information that describes data including specific files and directories. Metadata is not part of the stored data itself. Metadata is primarily used to facilitate in organizing and finding data quickly and easily. In certain instances metadata includes the file name, file size, creation time, last access, and block pointers. Metadata for a directory can include names and references to files and sub-directories.

According to a novel aspect of the present invention, a metadata map is formed and preserved at the block level, and not file level, of sending and receiving devices. Upon the initiation of a file transfer, a receiving location/site determines, using a metadata map, what block matches exist between the sending and receiving devices. Essentially, pre-existing data blocks at the receiving site are identified and then utilized to build the originally requested file. In the present invention, pre-existing data blocks do not require an actual transfer process. This novel feature decreases the overall time it takes to transfer a file by utilizing the pre-existing data blocks so that it is unnecessary to transfer a percentage of the file.

According to the present invention, the receiving site references all of the pre-existing metadata it has stored which corresponds to existing locally stored data block matches. The receiving site is able to determine the remaining blocks it needs, difference blocks, to produce the requested file. According to embodiments of the present invention, the receiving site can form a gird network with multiple systems in order to provide the difference blocks.

The file transfer is not limited to obtaining the difference blocks from one sending device.

Initially a gird network is formed between a requesting/receiving site and a plurality of sending sites belonging to the same network. Metadata mapping software is launched at the requesting site and the plurality of sending sites. A metadata map for a requested file is sent and compared to a pre-existing metadata map at the receiving site. The pre-existing metadata map contains information concerning all of the locally stored data blocks at the receiving site.

Difference blocks, indicative of data blocks that the receiving site needs in order to generate the requested file, are formed if the pre-existing metadata map is missing data blocks which form the requested file. According to embodiments of the present invention, the metadata map comparison identifies block matches between the metadata at the receiving site and a sending site. Furthermore, the comparison can check for block matches between the metadata at the receiving site and a multitude of sending sites.

A missing metadata map, identifying the missing difference blocks, is formed at the receiving site and transmitted to the plurality of sending sites part of the gird network. From the multitude of sending sites, a plurality of available servers storing the difference blocks are identified. A data block that is not pre-existing at the receiving site is transferred from one of the multitude of sending sites containing the data block. Other data blocks not existing at the receiving site and needed to produce the requested file are also transferred to the receiving site. The data blocks are transferred from either the same sender or another sender from a multitude of identified sending sites. Data pre-existing at the receiving site does not require a transfer process.

Once the data transfer is complete, using the metadata map, the originally requested file is built using both the pre-existing and transferred data blocks. According to embodiments of the present invention, the receiving site is a storage device.

The metadata maps contain and preserve information concerning the description of the file to be transferred to the receiving site. According to embodiments of the present invention, the descriptive information concerns the data blocks of the file to be transferred, mapped at the 8 kb data block level of the receiving and plurality of sending devices. However, according to other embodiments of the present invention, data blocks can be mapped at the 4 kb block level or 16 kb block level. In other embodiments, larger data block levels over 16 kb can be implemented.

When a smaller data block size is implemented, for example, 4 kb, a bigger metashape or metadata map is likely to be formed. Additionally, when smaller sized data blocks are used, the number of metadata blocks required by the receiving site is likely to increase. However, when using smaller sized data blocks finding data block matches are more feasible since less data is mapped to each block. In comparison, when bigger data block sizes are used, for example, 16 kb, while less data blocks are likely required, it is expected to be more difficult to find the data block matches.

For illustrative purposes, suppose a user attempts to download a large file from an IBM site. First, according to the present invention, the large file is divided into 8 kb data blocks. Next, IBM checks to see if the user already has all the data blocks stored locally contained in the large file. Next, the remaining data blocks not found at the receiving site are transferred from other servers on the IBM grid. The missing blocks are routed to allow for the fastest transmission. Finally, the missing and pre-existing blocks are assembled together into the large file the user requested.

According to the present invention, the difference blocks are routed from the plurality of available servers to allow for the fastest transmission to the receiving site. The fastest path can be determined by latency. Generally, the time of the download will not be long since only blocks, rather than an entire file, are being transferred to the receiving site. Therefore, the time to establish the connection with the available server can be determinative. In other embodiments of the present invention, the fastest pathway is determined based on location of the available servers. And in yet other embodiments, the fastest pathway is determined based on latency and location of the plurality of available servers. Furthermore, where a multitude of senders are identified and transfer data blocks to the receiving site, the present invention allows for a multi-lined, non-sequential data transfer.

Figure 1:
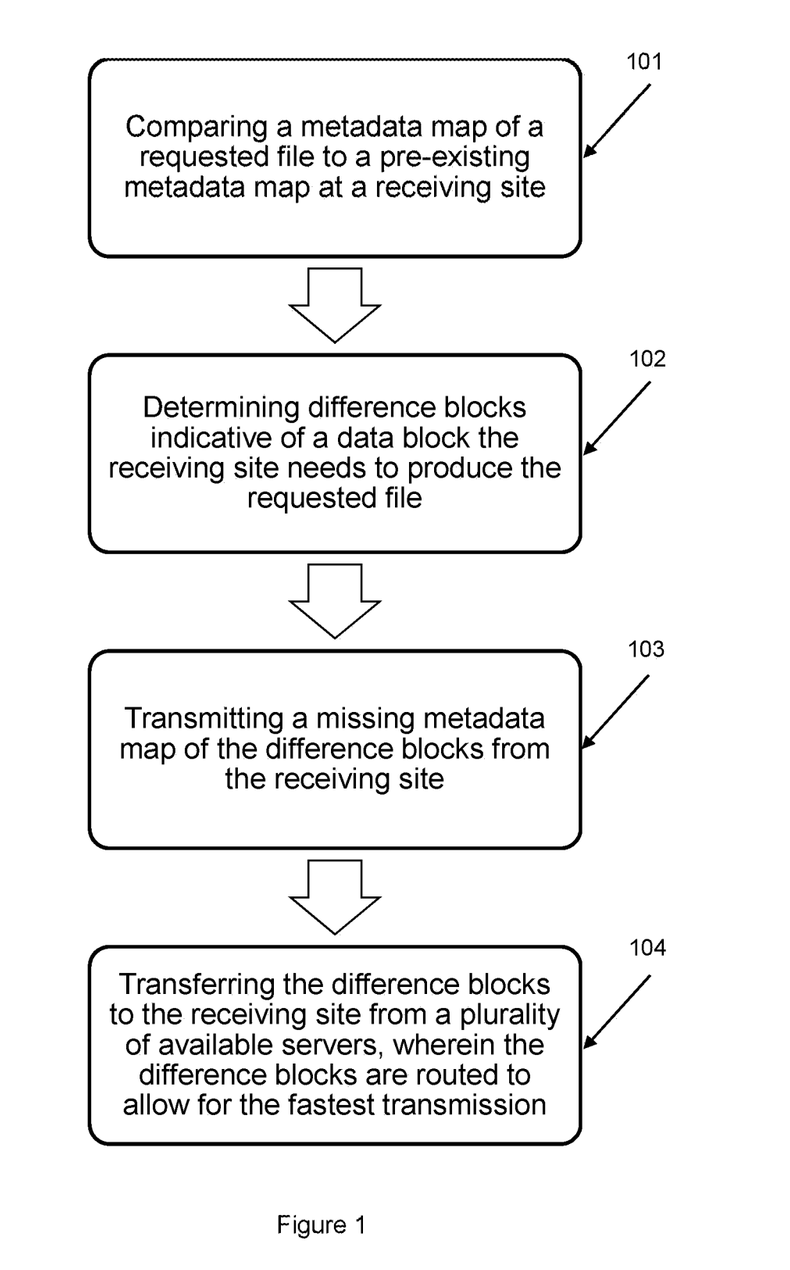
FIG. 1 is a flowchart diagram of an exemplary method for efficient data transfer using metadata sharing according to embodiments of the present invention.

FIG. 1 depicts a flowchart diagram of an exemplary method for efficient data transfer using metadata sharing according to embodiments of the present invention. In step 101 a metadata map of a requested file is compared to a pre-existing metadata map at a receiving site. The metadata depicts the makeup of a requested file. Metadata is data, information held as a description, about the data (stored data) of a requested file. In the present invention, the requested file itself is not transmitted to the receiving site. In step 102 the receiving site determines the difference blocks. The difference blocks are indicative of the data blocks required by the receiving site to produce the requested file.

According to embodiments of the present invention, the difference blocks will indicate all of the data blocks the receiving site needs in order to produce the requested file. In another embodiment of the present invention, there are no difference blocks and the receiving site already has all the data blocks, referred to as pre-existing data, stored locally to produce the requested file. In yet another embodiment, the difference blocks will represent a portion of missing data blocks that equates to less than 100% of the data but equal to or greater than 0% of the requested file. In yet another embodiment of the present invention, the difference blocks equates to 100% of the data in the file requested.

By way of non-limiting example, according to embodiments of the present invention, a 200 megabyte file is requested by a receiving site. Of the 200 megabytes, 50 megabytes of the file is found to already exist at the receiving site. Therefore, only 150 megabytes, or 75% of the data blocks, that make up the file need to be transferred or downloaded to the receiving site. The receiving site ultimately forms the file by combining the pre-existing data blocks with the transferred data blocks.

In step 103, a missing metadata map of the difference blocks is transmitted by the receiving site. In step 104 the requested difference blocks are transferred over the network to the receiving site from a plurality of available servers. The difference blocks can be routed to the receiving site from one or more available servers with each available server transmitting one or more of the difference blocks.

With continued reference to FIG. 1, the difference blocks are routed to the receiving site allowing for the fastest transmission. In embodiments of the present invention, the fastest available transmission is determined by latency and location of the available server, which is part of the host network, containing the difference block.

Figure 2:
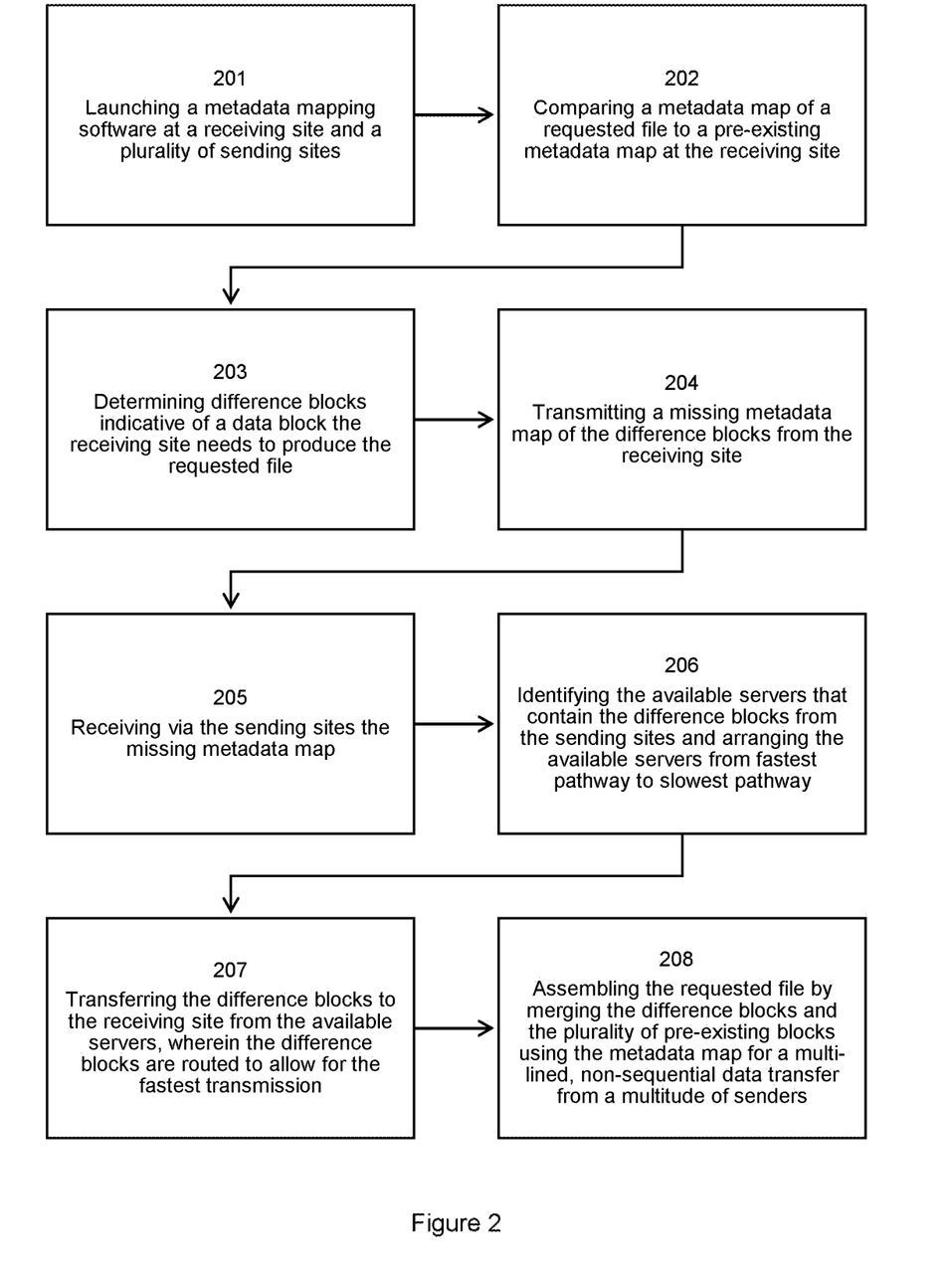
FIG. 2 is another detailed flowchart diagram of an exemplary method for efficient data transfer using metadata sharing according to embodiments of the present invention.

Now referring to FIG. 2. FIG. 2 illustrates a detailed flowchart diagram of an exemplary method for efficient data transfer using metadata sharing according to embodiments of the present invention. As illustrated in step 201, a metadata mapping software is launched at a receiving site and a plurality of sending sites. The plurality of sending sites are generally part of a grid network or system. In step 202 the metadata map of a requested file is compared at the receiving site to a pre-existing metadata map.

At step 203, difference blocks which are indicative of the data blocks the receiving site needs in order to produce the requested file are determined. The difference blocks are data blocks included in the metadata map of the requested file, but not found in the pre-existing metadata map at the receiving site. The difference blocks indicate all of the data the receiving site needs to produce the requested file. In another embodiment of the present invention, there are no difference blocks and the receiving site already has all the data blocks, referred to as pre-existing data, stored locally to produce the requested file. In yet another embodiment, the difference blocks will represent a portion of missing data blocks that equates to less than 100% of the data but more than 0% of the requested file. In yet another embodiment of the present invention, the difference blocks equate to 100% of the data in the file requested.

With continued reference to FIG. 2, in step 204 the receiving site transmits a missing metadata map of the difference blocks needed to generate the requested file. The missing metadata map is transmitted to the plurality of sending sites included in the grid network. At step 205 the plurality of sending sites receives the missing metadata map. Each sending site compares the missing metadata map of the difference blocks to its own metadata map to determine if it contains any or all of the difference blocks. In an embodiment of the present invention, a sending site does not contain any of the difference blocks. In another exemplary embodiment of the present invention, a sending site contains one or more of the difference blocks.

At step 206 the available servers that contain the difference blocks required to produce the requested file are identified from the plurality of sending sites. Once the available servers are identified, the available servers are arranged in order from fastest pathway to slowest pathway. The fastest pathway is determined by latency, the time it takes to get the connection configured between a particular available server and the receiving site. Additionally, the location of an available server is considered in determining the fastest pathway. According to embodiments, the download time is a factor in determining the fastest pathway.

In accordance with certain embodiments of the presently disclosed subject matter, the difference blocks are transferred to the receiving site from the available servers in step 207. The difference blocks are routed to the receiving site from the sending sites to allow for the fastest transmission in accordance with the pathway speeds determined in step 206. In step 208, once the difference blocks are received by the receiving site, the requested file is assembled by merging the difference blocks and the plurality of pre-existing blocks using the metadata map of the requested file allowing for a multi-lined, non-sequential data transfer from a multitude of senders.

Figure 3:
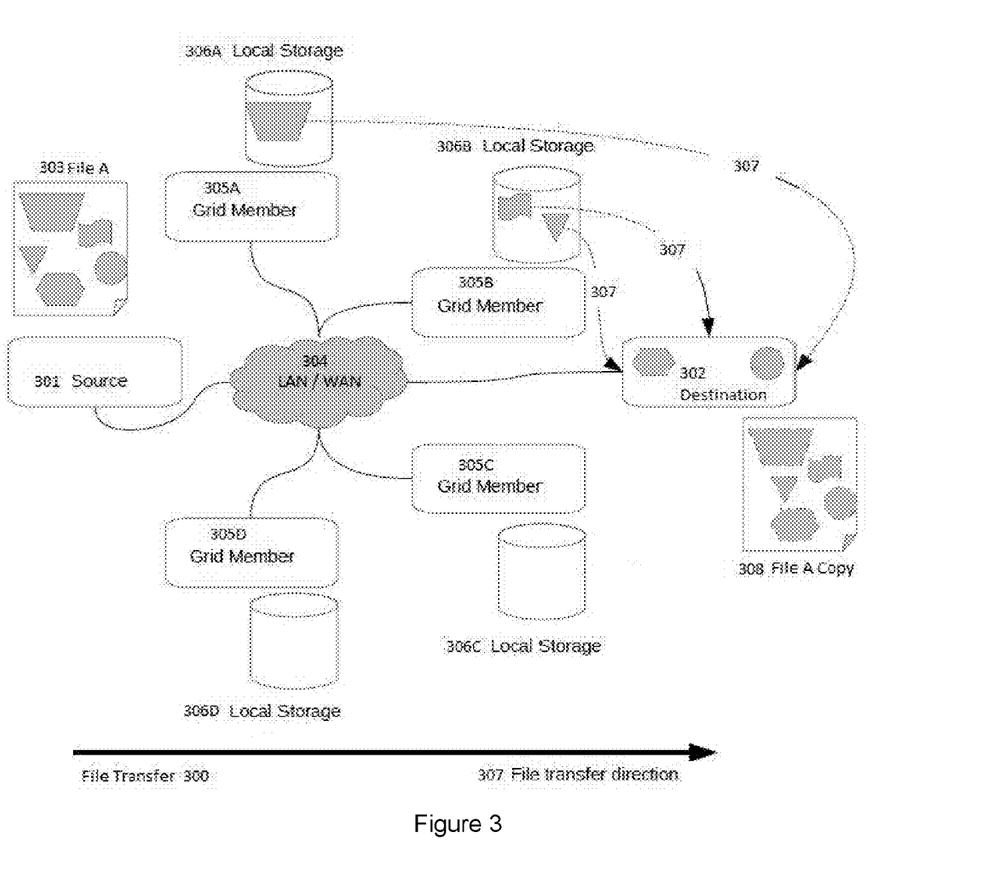
FIG. 3 is a detailed illustration showing an exemplarily file transfer using a plurality of pre-existing blocks according to embodiments of the present invention.

FIG. 3 is a detailed illustration showing an exemplarily file transfer 300 using a plurality of pre-existing blocks and difference blocks according to embodiments of the present invention. In accordance with certain embodiments, metadata mapping software is launched at a sender site, source 301, and a receiving site, destination 302. The metadata for a requested file, 303 file A, located at source 301 is transmitted to destination 302. Destination 302 compares the metadata makeup of requested file, 303 file A, against its own metadata map of pre-existing data blocks.

Destination 302 forms and transmits a new metadata map, the missing metadata map, of all the data blocks needed by destination 302 to produce requested 303 file A to a plurality of senders over network LAN/WAN 304. Pre-existing data blocks at destination 302 are not included in the missing metadata map. Using the missing metadata map, network LAN/WAN 304 knows exactly which data blocks are needed by destination 302, the receiving site, in order to produce requested 303 file A. Network LAN/WAN 304 alerts its environment, grid members 305A-D, of the requested file transfer, what data blocks are needed, and what the user's information is as it pertains to location and latency. Available systems, local storages 306A and 306B, containing the missing needed information are identified from a plurality of available systems, local storage 306A-D, and are ordered from fastest pathway to slowest pathway.

Traffic is routed 307 from the local storage sites to allow for the fastest transmission between all available systems, local storages 306A-D, and the receiving site, destination 302. In accordance with embodiments of the present invention, the file transfer moves in direction 307. Destination 302 receives only the missing data blocks from local storages 306A and 306B and assembles the requested file, 308 file A copy, using the transferred and pre-existing data blocks. Pre-existing data blocks found on local storage 306A-D are not transferred to destination 302.

Figure 4:
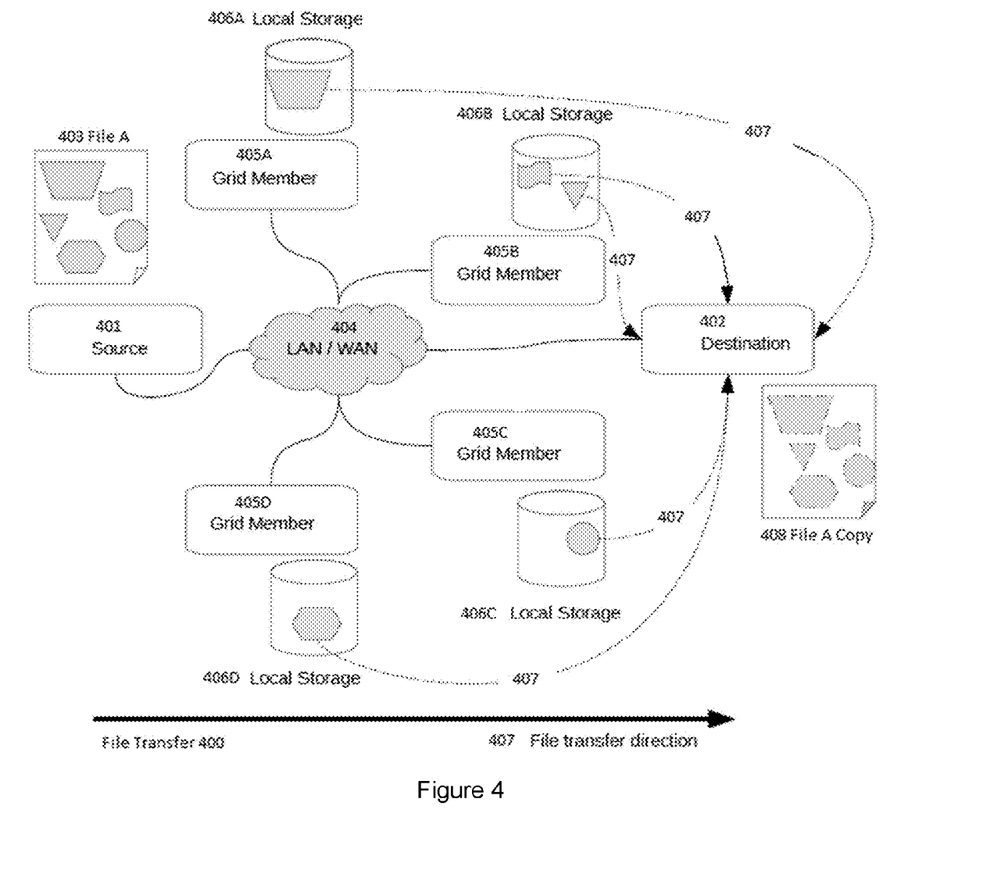
FIG. 4 is a detailed illustration showing an exemplarily file transfer using difference blocks routed to allow for the fastest transmission according to embodiments of the present invention.

FIG. 4 is a detailed illustration showing an exemplarily file transfer using only difference blocks that are routed to a receiving site in order to allow for the fastest transmission according to embodiments of the present invention. Initially, destination 402 requests a file transfer for 403 file A. Next, metadata mapping software is launched at source site 401 and destination site 402. The metadata makeup of 403 file A at source 401 is transmitted to the receiving site, destination 402.

Destination 402 receives the metadata map of the requested file and compares it against its own pre-existing metadata map. Destination 402 forms a missing metadata map encompassing the data blocks, difference blocks, it requires in order to produce the requested file. According to embodiments of the present invention each data block mapped in each metadata map represents a block of data at the 8 kb data block level. Next, destination 402 transmits the missing metadata map, without any pre-existing data to LAN/WAN 404, a grid network including a plurality of sending sites. Pre-existing data at destination 402 does not require an actual transfer process. LAN/WAN 404, knowing exactly which pieces are missing from destination 402, alerts its environment, grid members 405A-D, of the transfer, what is needed, and what the user's information (destination 402) is as it pertains to location and latency.

According to embodiments of the present invention, available systems, local storage 406A-D, containing the difference blocks needed by destination 402n are identified and ordered from fastest pathway to slowest pathway. Traffic is routed 407 from the local storage sites 406A-D to allow for the fastest transmission between all identified available systems 406) and the receiving site, destination 402. The data block transfer moves in file transfer direction 407. Destination 402 receives only the missing data blocks it needs to produce 403 file A. Destination 402 then assembles 408 file A copy using the transferred difference blocks and pre-existing data blocks.

Figure 5:
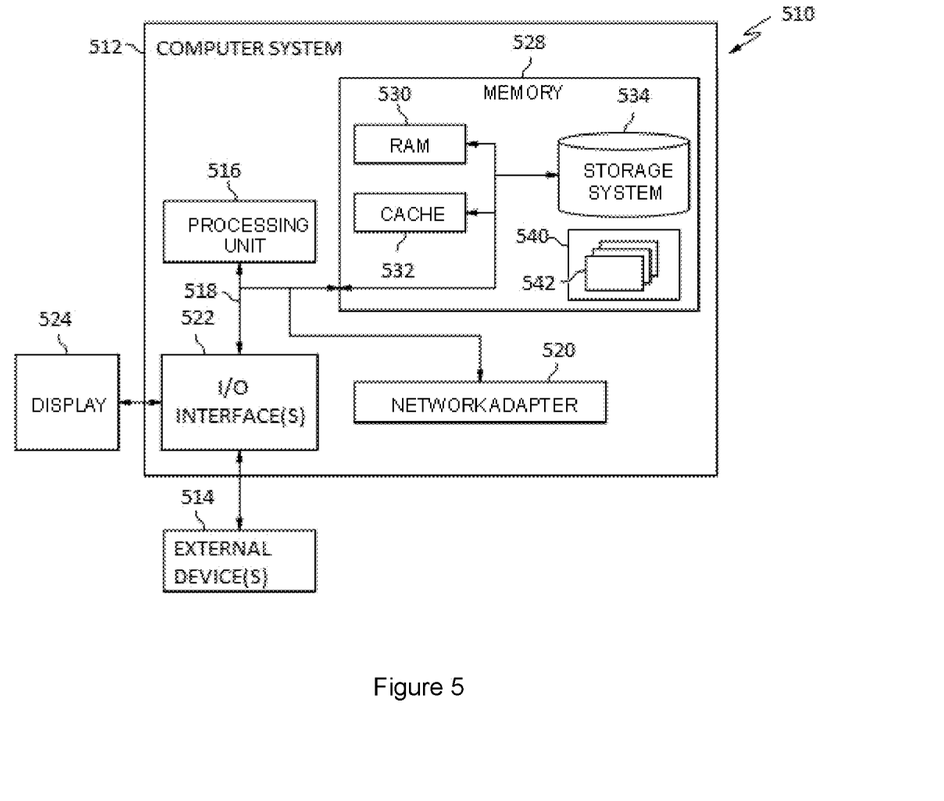
FIG. 5 is a block diagram of an exemplary computer system/server which is applicable to implement embodiments of the present invention.

FIG. 5 is a block diagram of an exemplary computer system/server which is applicable to implement embodiments of the present invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 5 shows a block diagram of an exemplary computer system/server 512 which is applicable to implement the embodiments of the present invention. The computer system/server 512 shown in FIG. 5 is only illustrative and is not intended to suggest any limitation as to the scope of use or functionality of embodiments of the invention described herein.

As shown in FIG. 5, computer system/server 512 is shown in the form of a general-purpose computing device. The components of computer system/server 512 can include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media can be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 can further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 can include at least one program product having a set (e.g., at least one) of program modules that are configured to carry out the functions of embodiments of the invention.

Program/utility 540, having a set (at least one) of program modules 542, can be stored in memory 528, by way of example, and not limitation, as well as an operating system, one or more application programs, other program modules, and program data. Each of the operating system, one or more application programs, other program modules, and program data or some combination thereof, can include an implementation of a networking environment. Program modules 542 generally carry out the functions and/or methodologies of embodiments of the invention as described herein.

Computer system/server 512 can also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components can be used in conjunction with computer system/server 512. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. In some alternative implementations, the functions noted in the blocks can occur out of the order noted in the figures. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for efficient data transfer using metadata sharing, the method comprising:
   determining difference blocks by comparing a metadata map of a requested file by a plurality of sending sites to a pre-existing metadata map at a receiving site such that the plurality of sending sites compare the difference blocks of the requested file prior to transferring any data corresponding to the requested file to the receiving site, wherein a difference block is a data block the receiving site needs to generate the requested file;
   mapping the difference blocks in a missing metadata map, wherein the difference blocks mapped in the missing metadata map are determined at an 8 kb block level;
   transmitting the missing metadata map from the receiving site;
   transferring the difference blocks to the receiving site from a plurality of available servers comprising the plurality of sending sites, wherein the difference blocks are transferred to allow for fastest transmission;
   launching a metadata mapping software at the receiving site and the plurality of sending sites;
   forming a grid network with the plurality of sending sites and the receiving site;
   receiving via the plurality of sending sites the missing metadata map transmitted from the receiving site;
   identifying the plurality of available servers that contain the difference blocks from the plurality of sending sites; and
   arranging the plurality of available servers containing the difference blocks from fastest pathway to slowest pathway, wherein determining the fastest pathway is based on latency and location of an available server, wherein the plurality of available servers provide the difference blocks to the receiving site allowing for a multi-pathed, non-sequential data transfer from a multitude of senders.

2. The method according to claim 1, wherein the pre-existing metadata map comprises:
   a plurality of blocks stored at the receiving site and utilized to assemble the requested file.

3. The method according to claim 2, further comprising:
   assembling the requested file by merging the difference blocks and the plurality of blocks using the metadata map.

4. A system for efficient data transfer using metadata sharing in a computing environment, the system comprising:
   at least one processor device operable in the computing environment, wherein the at least one processor device:
   determines difference blocks by comparing a metadata map of a requested file by a plurality of sending sites to a pre-existing metadata map at a receiving site such that the plurality of sending sites compare the difference blocks of the requested file prior to transferring any data corresponding to the requested file to the receiving site, wherein a difference block is a data block the receiving site needs to generate the requested file;
   maps the difference blocks in a missing metadata map, wherein the difference blocks mapped in the missing metadata map are determined at an 8 kb block level;
   transmits the missing metadata map from the receiving site;
   transfers the difference blocks to the receiving site from a plurality of available servers comprising the plurality of sending sites, wherein the difference blocks are transferred to allow for fastest transmission;
   launches a metadata mapping software at the receiving site and the plurality of sending sites;
   forms a grid network with the plurality of sending sites and the receiving site;
   receives via the plurality of sending sites the missing metadata map transmitted from the receiving site;
   identifies the plurality of available servers that contain the difference blocks from the plurality of sending sites; and
   arranges the plurality of available servers containing the difference blocks from fastest pathway to slowest pathway, wherein determining the fastest pathway is based on latency and location of an available server, wherein the plurality of available servers provide the difference blocks to the receiving site allowing for a multi-pathed, non-sequential data transfer from a multitude of senders.

5. The system according to claim 4, wherein the pre-existing metadata map comprises:
   a plurality of blocks stored at the receiving site and utilized to assemble the requested file.

6. The system according to claim 5, further comprising:
   assembling the requested file by merging the difference blocks and the plurality of blocks using the metadata map.

7. A computer program product for efficient data transfer using metadata sharing, the computer program product comprising a non-transitory computer-readable storage medium having computer-readable program code portions comprising:
   a first executable portion that determines difference blocks by comparing a metadata map of a requested file by a plurality of sending sites to a pre-existing metadata map at a receiving site such that the plurality of sending sites compare the difference blocks of the requested file prior to transferring any data corresponding to the requested file to the receiving site, wherein a difference block is a data block the receiving site needs to generate the requested file;
   a second executable portion that maps the difference blocks in a missing metadata map, wherein the difference blocks mapped in the missing metadata map are determined at an 8 kb block level;
   a third executable portion that transmits the missing metadata map from the receiving site;
   a fourth executable portion that transfers the difference blocks to the receiving site from a plurality of available servers comprising the plurality of sending sites, wherein the difference blocks are transferred to allow for fastest transmission;
   a fifth executable portion that launches a metadata mapping software at the receiving site and the plurality of sending sites;
   a sixth executable portion that forms a grid network with the plurality of sending sites and the receiving site;
   a seventh executable portion that receives via the plurality of sending sites the missing metadata map transmitted from the receiving site;
   an eighth executable portion that identifies the plurality of available servers that contain the difference blocks from the plurality of sending sites; and
   a ninth executable portion that arranges the plurality of available servers containing the difference blocks from fastest pathway to slowest pathway, wherein determining the fastest pathway is based on latency and location of an available server, wherein the plurality of available servers provide the difference blocks to the receiving site allowing for a multi-pathed, non-sequential data transfer from a multitude of senders.

8. The computer program product of claim 7, further comprising:
   a tenth executable portion that assembles the requested file by merging the difference blocks and a plurality of pre-existing blocks using the metadata map.

* * * * *